(12) United States Patent
Sato

(10) Patent No.: US 7,047,240 B2
(45) Date of Patent: May 16, 2006

(54) FILE BACKUP METHOD AND STORAGE APPARATUS, COMPUTER PROGRAM THEREFOR AND COMPUTER-READABLE MEDIUM CONTAINING THE SAME

(75) Inventor: Eiichi Sato, Kanagawa (JP)

(73) Assignee: Hitachi, Ltd., Tokyo (JP)

( * ) Notice: Subject to any disclaimer, the term of this patent is extended or adjusted under 35 U.S.C. 154(b) by 91 days.

(21) Appl. No.: 10/370,836

(22) Filed: Feb. 21, 2003

(65) Prior Publication Data

US 2003/0182329 A1 Sep. 25, 2003

(30) Foreign Application Priority Data

Mar. 20, 2002 (JP) ............................. 2002-078219

(51) Int. Cl.
*G06F 17/30* (2006.01)
(52) U.S. Cl. ...................... 707/8; 707/203; 707/204
(58) Field of Classification Search ............... 707/204, 707/200, 203, 8, 201
See application file for complete search history.

(56) References Cited

U.S. PATENT DOCUMENTS

| | | | |
|---|---|---|---|
| 6,163,856 A | 12/2000 | Dion et al. | |
| 6,253,211 B1* | 6/2001 | Gillies et al. | 707/201 |
| 6,324,548 B1 | 11/2001 | Sorenson | |
| 6,408,163 B1* | 6/2002 | Fik | 455/3.01 |
| 6,516,327 B1 | 2/2003 | Zondervan et al. | |
| 6,611,849 B1 | 8/2003 | Raff et al. | |
| 6,643,671 B1 | 11/2003 | Milillo et al. | |
| 6,718,352 B1* | 4/2004 | Dang et al. | 707/205 |
| 6,738,791 B1 | 5/2004 | Ueda et al. | |
| 6,779,003 B1* | 8/2004 | Midgley et al. | 707/204 |
| 2003/0074599 A1* | 4/2003 | Golasky et al. | 714/6 |
| 2003/0131025 A1 | 7/2003 | Zondervan et al. | |

FOREIGN PATENT DOCUMENTS

| | | |
|---|---|---|
| JP | 05-265829 | 10/1993 |
| JP | 07-210430 | 8/1995 |
| JP | 10-091505 | 4/1998 |

* cited by examiner

*Primary Examiner*—Jack M Choules
(74) *Attorney, Agent, or Firm*—Townsend and Townsend and Crew LLP

(57) ABSTRACT

A method of backing up a file comprises synchronizing a first file to be backed up and a second file which is a copy of the first file to contain the same contents; monitoring a file close process of the first file in a read/write mode, and when the file close process is detected, locking the first file and stopping synchronization of the first file and the second file, and unlocking the first file thereafter; creating a third file which is a copy of the second file; and resuming the synchronization of the first file and the second file.

20 Claims, 7 Drawing Sheets

FILE BACKUP METHOD AND STORAGE APPARATUS, COMPUTER PROGRAM THEREFOR AND COMPUTER-READABLE MEDIUM CONTAINING THE SAME

CROSS-REFERENCE TO RELATED APPLICATIONS

The present application claims priority upon Japanese Patent Application No. 2002-78219 filed on Mar. 20, 2002, which is herein incorporated by reference.

BACKGROUND OF THE INVENTION

1. Field of the Invention

The present invention relates generally to a file backup technique, and more specifically relates to a technique applicable and effective for backup technique of files which are accessed and updated by a plurality of clients in a device enabling a plurality of clients to access to files and storage regions via a network, such as NAS (Network Attached Storage, hereinafter referred to simply as "NAS") or a file server.

2. Description of the Related Art

In backup of a file with a conventional NAS or file server, if a file is used by a plurality of clients during its update when backup of the file is being conducted, data of the file to be backed up is retrieved as being in an unfixed state. Thus, in order to retrieve backup of the file as being closed and fixed, it is necessary for the respective clients to temporarily stop access to the file to be backed up for backup, and permit the clients to re-access to the file after the backup.

It is to be noted that Japanese Patent Application Laid-open Publication No. 5-265829 discloses a technique to maintain identity of replicas without the need of communication between a server and a replica server by means of monitoring communication between a client and a server on the LAN by the replica server and then updating the replica by taking in information from the client to the server.

Further, Japanese Patent Application Laid-open Publication No. 7-210430 discloses a technique for backup by defining the position and size of the file to be backed up and the position and capacity of backup medium, relating the former information with the latter information, and selecting a suitable medium subsequently.

Further, Japanese Patent Application Laid-open Publication No. 10-91505 discloses a technique enabling file sharing between workstations in a network environment including a plurality of workstations which do not have shared disks by configuring information of an original file name of a file to be backed up and a backup destination.

In a conventional NAS or file server, a file used in NAS or a file server was accessed by multiple clients to share information and it was difficult to identify which client was accessing to the file at the time of backup during actual use. In this situation, it is very difficult to realize a method where all clients are requested to temporarily stop accessing to the file to be backed up, and then be notified of accessibility to the file after completing backup.

Further, in the techniques disclosed in the above-mentioned Japanese Patent Publications, technical problems as described above regarding backup of files in a storage apparatus shared on a network are not appreciated.

SUMMARY OF THE INVENTION

One object of the present invention is to provide a file backup technique where backup of files shared on a network can be performed online accurately.

One aspect of the present invention is a method of backing up a file comprising synchronizing a first file to be backed up and a second file which is a copy of the first file to contain the same contents, monitoring a file close process of the first file in a read/write mode, and when the file close process is detected, locking the first file and stopping synchronization of the first file and the second file, and unlocking the first file thereafter, creating a third file which is a copy of the second file, and resuming the synchronization of the first file and the second file.

Features and objects of the present invention other than the above will become clear by reading the description of the present specification with reference to the accompanying drawings.

BRIEF DESCRIPTION OF THE DRAWINGS

For a more complete understanding of the present invention and the advantages thereof, reference is now made to the following description taken in conjunction with the accompanying drawings wherein.

DETAILED DESCRIPTION OF THE INVENTION

At least the following matters will be made clear by the explanation in the present specification and the description of the accompanying drawings.

SUMMARY OF THE DISCLOSURE

As an example, in respect to a file to be backed up, a file open process and a file close process in a Read/Write mode (R/W mode), which is carried out with the file content update process by the client, is monitored, and a plurality of replica files are created to be synchronized with the file to be backed up. When completion of the file close process performed at the time of update process by the client is detected, the file to be backed up is temporarily locked as an internal process of the NAS or the file server, synchronization process of one out of the plurality of replica files is stopped, and the file is immediately unlocked. Here, the replica file which has been split from the synchronization process contains a file which has carried out the file close process and is halted (for example, in a state where all data in a cache memory or a buffer with respect to the file are reflected therein). Meanwhile, the file to be backed up itself is locked by the NAS or the file server for an instant in order to stop synchronization with the replica file, but update process by the client can be performed immediately thereafter.

In the NAS or the file server, the replica file which has been split from the file to be backed up is copied to a backup region as a fixed backup file. When the copying is completed, the synchronization process of the replica file which was stopped, is resumed. In this way, backup files are obtained which became fixed every time update process of files by the clients is performed. These backup files may be used as historical files.

In this way, it becomes possible to automatically obtain backup of files which are halted without any intervention from the client side while the NAS or the file server operates online, and also to manage the backup files as historical files.

EMBODIMENTS

Hereinbelow, an embodiment of the present invention is described in detail referring to the accompanying drawings.

Figure 1:
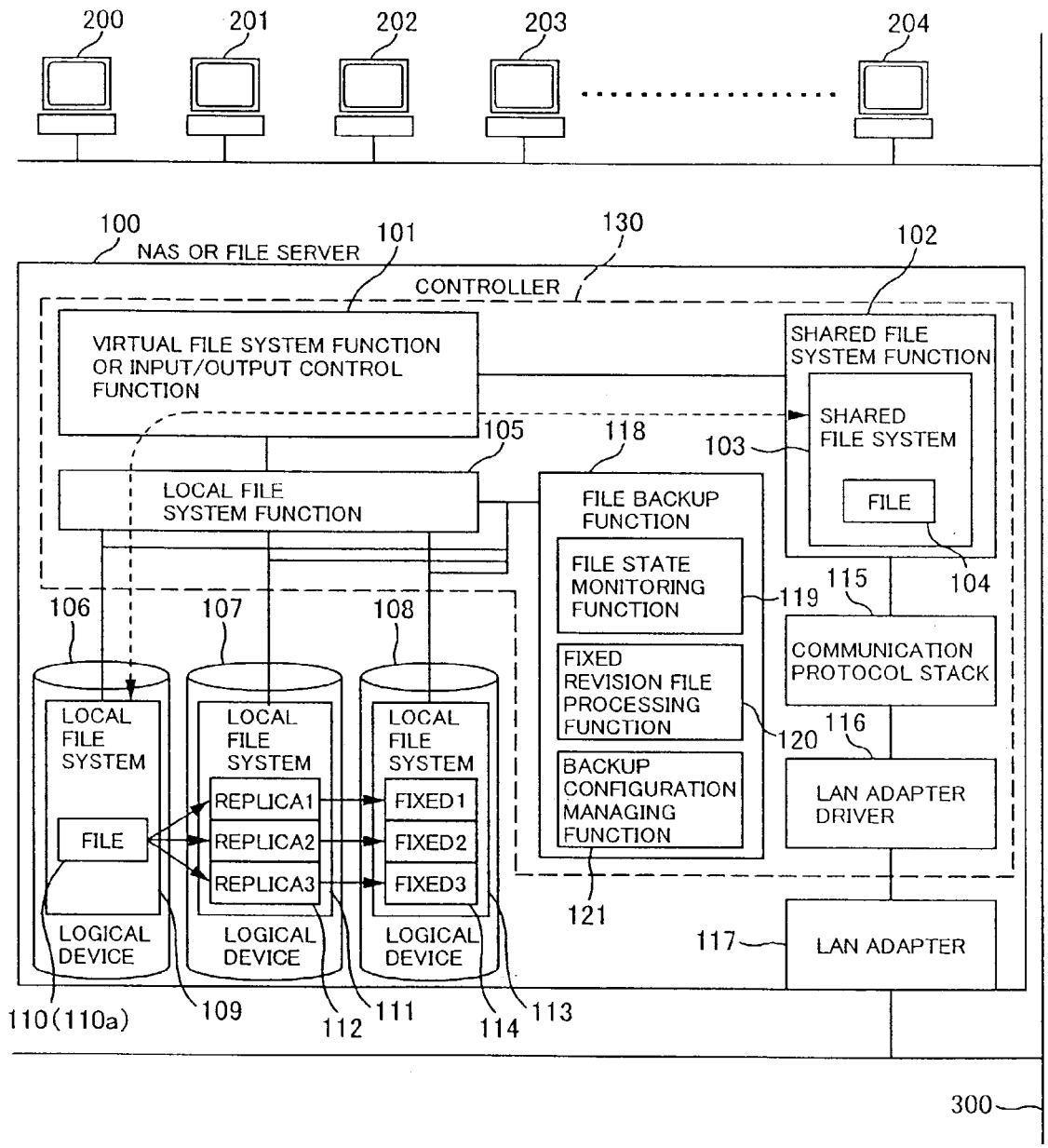
FIG. 1 is a schematic diagram showing an example of a configuration of an information processing system including a storage apparatus implementing a file backup method of an embodiment of the present invention.
Figure 2:
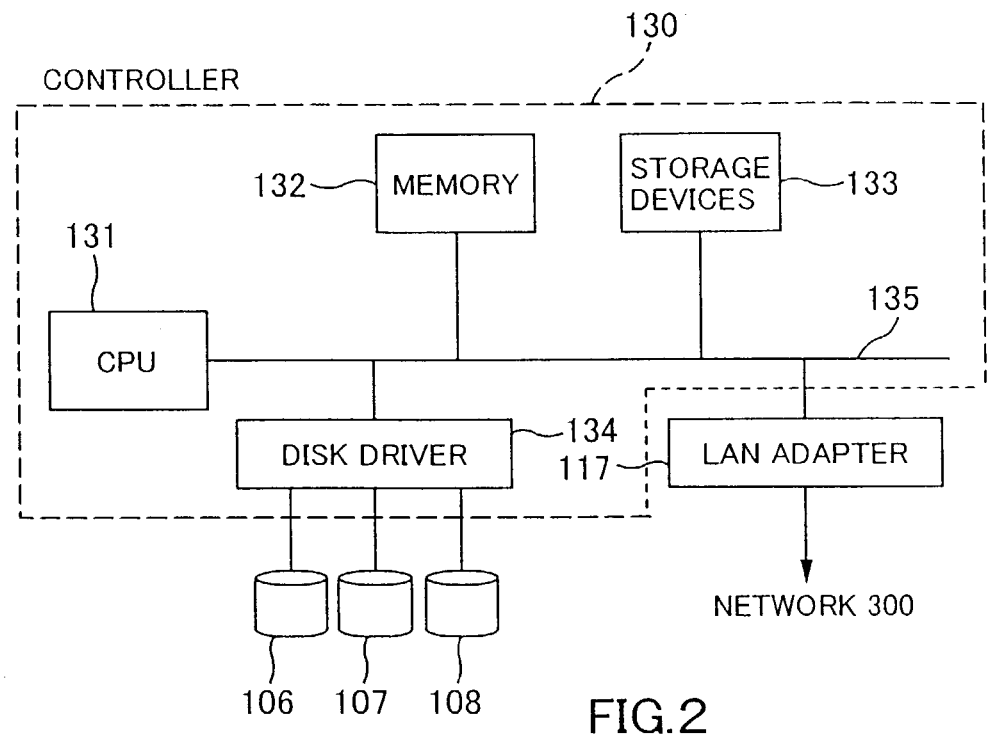
FIG. 2 is a schematic diagram illustrating one example of a hardware configuration of a controller of the storage apparatus in FIG. 1.

FIG. 1 is a schematic diagram showing an illustration of a configuration of an information processing system including a storage apparatus implementing a file backup method according to an embodiment of the present invention. FIG. 2 is a schematic diagram as focusing on a hardware configuration of a controller of the storage apparatus in FIG. 1. In this embodiment, a NAS or a file server is taken as an example of the storage apparatus.

In the information processing system of the present embodiment shown in FIG. 1, a NAS or a file server 100 and elements such as a plurality of clients 200, 201, 202, 203, and 204 utilizing the NAS or the file server 100 are connected via a network 300 such as a LAN or the Internet.

In the NAS or the file server 100, local file systems 109, 111, and 113 which are recognizable by the NAS or the file server 100 are constructed in respect to logic devices 106, 107, 108 by a local file system function 105. From among the constructed local file systems, a system like the local file system 109, which is made available on the network by a shared file system function 102 via a virtual file system function or an input output control function 101, is shared on the network as a shared file system 103, and a file 104 may be used by the clients 200–204 on the network via the network 300, a LAN adapter 117, a LAN adapter driver 116, and a communication protocol stack 115.

The file system and a usable file which are visible from the clients 200–204 side are the shared file system 103 and the file 104. As an entity inside the NAS or the file server 100, the local file system 109 and the file 110 are seen transparently via the virtual file system function or the input output control function 101.

In a typical NAS or file server 100 such as the above, in this embodiment there is provided a file backup function 118 which realizes file backup to be described later on. The file backup function 118 comprises a file state monitoring function 119, a fixed revision file processing function 120, and a backup configuration managing function 121.

The backup configuration managing function 121, 1) registers and manages a file to be backed up (a first file); 2) registers and manages a storing region of replica files 112 (a second file as a copy of the file to be backed up) to be intermediate files necessary to realize file backup by carrying out the file content synchronization process with the file to be backed up 110a online, and the number of created replica files; and 3) registers and manages a storing region of fixed revision files 114 (a third file as a copy of the file to be backed up via the replica file) which are obtained subsequently as final fixed backup files, and the number of fixed revision files. When registration of the storing region of the replica files 112 and the number of created replica files by the backup configuration managing function 121 is completed, the predetermined number of the replica files 112 are created in the defined storing region, and synchronization process is started. In the example of FIG. 1, there are created three replica files (replica 1–3) in the storing region 111.

In a state the file to be backed up 110a is synchronized with the replica files 112 set by the backup configuration managing function 121, the file state monitoring function 119 monitors the event that any of the clients locks the file to be backed up and the file open process and the file close process in a read/write mode are performed to the file to be backed up 110a. If the file close process is detected by the monitoring function 119, after completion of the file close process, the file to be backed up 110 is locked and the fixed revision file processing function 120 is requested to split the replica file 112 which is completely synchronized with the file to be backed up, and the file to be backed up 110a is unlocked when a notice is received from the fixed revision file processing function 120 of completing split of the replica file 112.

The fixed revision file processing function 120 monitors the synchronized state of the file to be backed up 110a and the replica files 112 set by the backup configuration managing function 121, and monitors which replica file is completely synchronized and has the same contents as the file to be backed up, and which replica file has just started synchronization and is still being synchronized. When the fixed revision file processing function 120 receives a request from the file state monitoring function 119 to split the replica file, the fixed revision file processing function 120 stops the synchronization process between one of the replica files 112 (replica 1–3) and the file to be backed up 110a to conduct split. Thereafter, the file state monitoring function 119 is immediately notified of completion of split of one of the replica files, and concurrently copies the split and halted replica file to the storing region of the fixed revision files 114 set by the backup configuration managing function 121 while revision management information such as a revision identifier, and a backup date, to create the fixed revision files 114. FIG. 1 is an example where three fixed revision files 114 (fixed revision files 1–3) are created and managed according to revision IDs of ascending numbers in the prepared storage region 113.

At the time of creating the fixed revision files as local files, if the number of fixed revision files to be created are not set by the backup configuration managing function 121, the fixed revision files may be subsequently created as much as the capacity of the storing region of the fixed revision files 114 allows. If an upper limit of the number of the fixed revision files is set, such set number of files are to be managed for revision management. In the case the number of the created revision files will exceed such number by creation of a new fixed revision file, the oldest fixed revision file is discarded, and the newly created fixed revision file is added. In other words, the oldest fixed revision file is replaced with the newly created one.

When creation of the fixed revision files is completed, the replica files which were used are returned to the synchronization process with the file to be backed up 110a, and is to be monitored of the synchronization state. In between the replica files 112 (replica 1–3) and the fixed revision files 114 (fixed revision files 1–3), certain files do not correspond to each other one to one. At the time the fixed revision files are created, any split replica file is registered as the newest revision of the entire fixed revision files.

FIG. 2 shows an example of a hardware configuration of a controller of the storage apparatus shown in FIG. 1. A controller 130 of the NAS or the file server 100 comprises a processor 131 controlling an entire file backup process, a memory 132 as a temporary data storage area for the processor 131, a storage device 133 storing, for example, computer program software defining the function of the processor 131, a disk driver 134 controlling disk devices configuring the logical devices 106 to 108, and a bus 135 connecting the preceding elements. The bus 135 is connected to the network 300 such as a LAN and the Internet via the LAN adapter 117 and enables the clients connected to the network 300 to access a shared file in the logical device. In the present embodiment, the functions described referring to FIG. 1 are embodied through computer program software stored in the storage device 133.

Figure 3A:
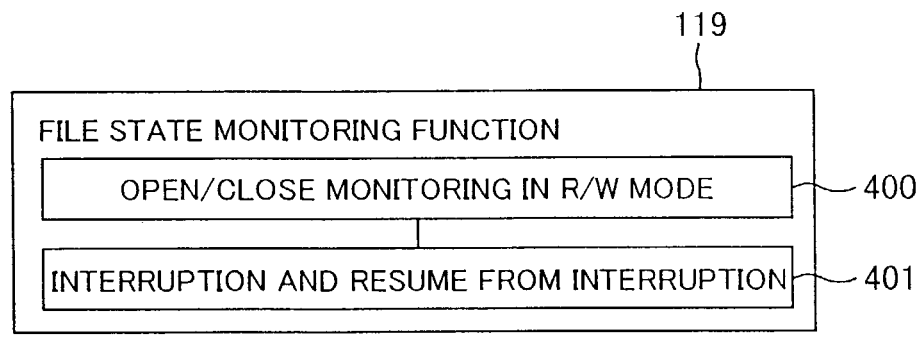
FIGS. 3A and 3B are schematic diagrams showing an example of a function of a configuration of the storage apparatus implementing the file backup method of an embodiment of the present invention respectively.
Figure 3B:
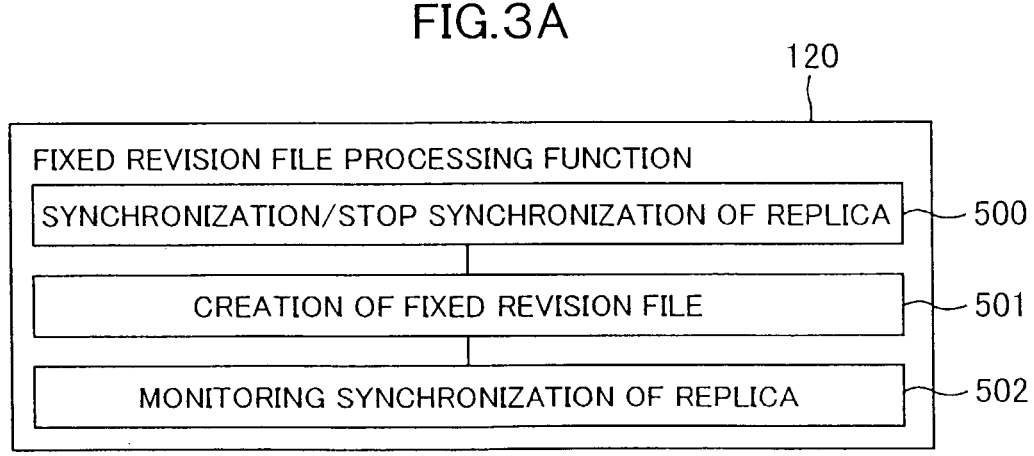

FIGS. 3A and 3B show an example of a detailed configuration of each of the file state monitoring function 119 and the fixed revision file processing function 120 constructing the file backup function 118.

The file state monitoring function 119 comprises an open/close monitoring function 400 in a read/write mode, and interruption and resume from interruption function 401. The open/close monitoring function 400 in a read/write mode monitors and detects the file open process and the file close process in the read/write mode (R/W mode) of the file to be backed up 110a. At the time the file close process has been detected, and the close process has been completed, the interruption and resume from interruption function 401 locks the file to be backed up 110a to be able to stop a synchronization process of the replica files. Then, the function 401 requests the fixed revision file processing function 120 to stop synchronization process of the replica files, and unlock the file to be backed up 110a upon receipt of a notification of return to synchronization process of the fixed revision file.

The fixed revision file processing function 120 comprises a replica synchronization and synchronization-stop function 500, a fixed revision file creating function 501, and a replica synchronization state monitoring function 502.

The replica synchronization and synchronization-stop function 500 stops synchronization process in respect to the request to stop synchronization process of replica files from the interruption and resume from interruption function 401 of the file state monitoring function 119, and notifies completion of stop of the synchronization process of the replica files to the interruption and resume from interruption function 401. Then, a request to create fixed revision files is made to the fixed revision file creating function 501, and after receiving notification of completion of fixed revision file creation from the fixed revision file creating function 501, operation of resynchronization of the replica files is carried out.

The fixed revision file creating function 501 receives a request to create fixed revision files from the replica synchronization and synchronization-stop function 500, and copies the halted replica files to the storing region of the fixed revision files to create the fixed revision files. Revision management information such as a revision identifier and a backup date is added thereto. Then, completion of creation of the fixed revision files is notified to the replica synchronization and synchronization-stop function 500.

The replica synchronization state monitoring function 502 monitors whether the replica files in synchronization process are in a fully synchronized state in which file contents are completely matching, or are in a state where resynchronization has just started and synchronization process is proceeding wherein updating data is under way and a part of the file contents is not matching. At the time the replica synchronization and synchronization-stop process 500 receives a request to stop synchronization process of the replica files from the interruption and resume from interruption function 401, the function 502 issues an instruction of designating a replica file, synchronization of which is to be stopped.

Figure 4:
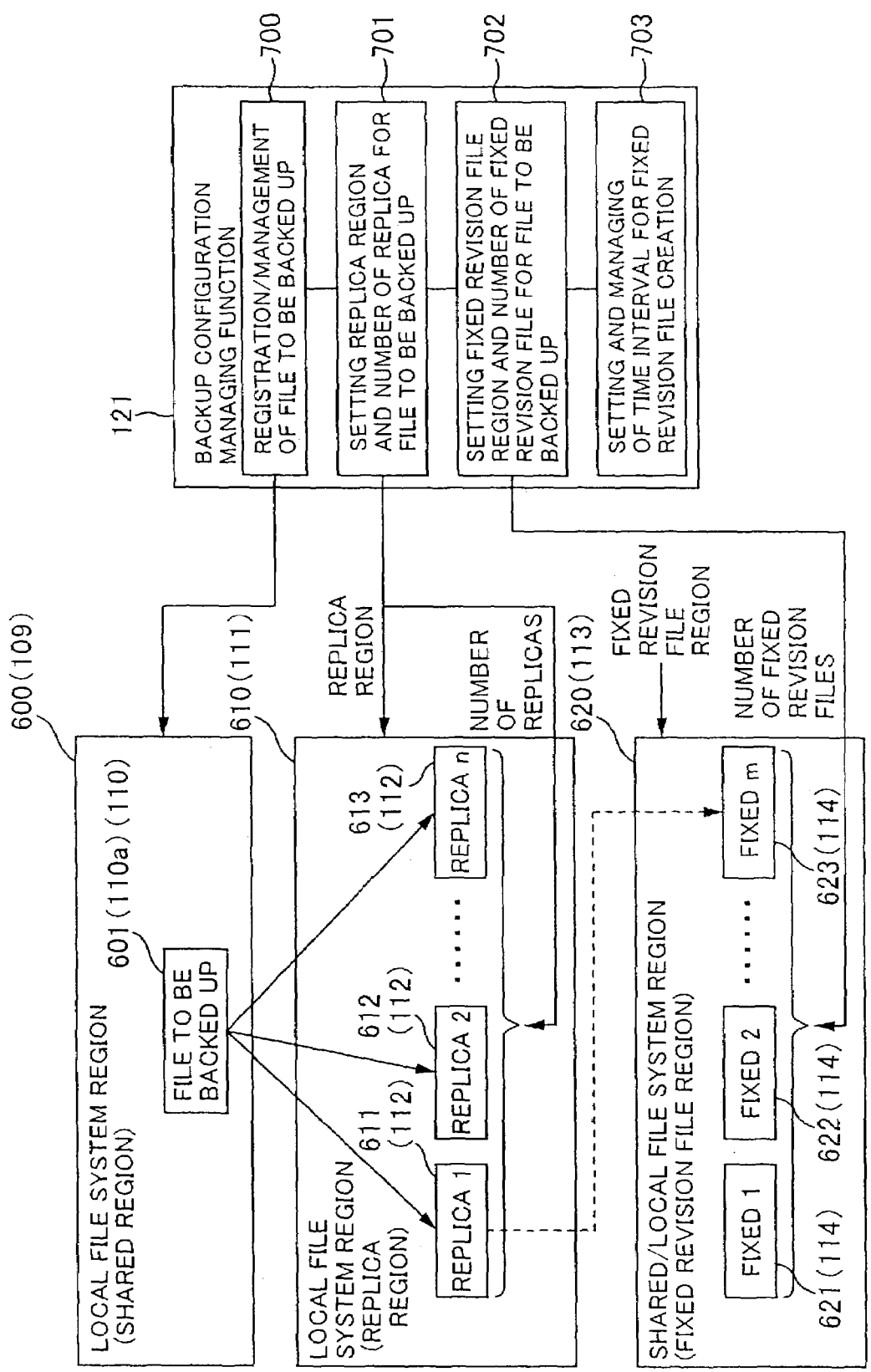
FIG. 4 is a schematic diagram showing an example of a function of the storage apparatus implementing the file backup method of an embodiment of the present invention.

Referring to FIG. 4, an example of the detailed structure of the backup configuration managing function 121, and an example of configuration for managing the replica files and the fixed revision files are described. As shown in FIG. 4, the backup configuration managing function 121 comprises a registration and management function 700 of a file to be backed up 601, a replica region and replica number setting function 701 of a file to be backed up, a fixed revision region and fixed revision number setting function 702 of a file to be backed up, and a fixed revision files creation interval setting and administration function 703. The registration and management function 700 of the file to be backed up registers and manages a predetermined file from among the files in a shared file system region which is accessible by clients 200–204 via the network 300 as a file 601 to be backed up. The replica region and replica number setting function 701 of a file to be backed up sets and manages the storing regions of the replica files and the number of replica files. The fixed revision region and fixed revision number setting function 702 of the file to be backed up sets and manages the storing regions of the fixed revision files 621–623 which are defined as a backup of the file 601 to be backed up and the number of fixed revision files for historical management. The fixed revision files creation interval setting and management function 703 creates the fixed revision files 621–623 efficiently in designated time intervals according to the need of the system, and not every time the file close process is detected.

The registration and management function 700 of the file to be backed up is used for a region which is made available on the network 300 and accessible by clients 200–204 on the network 300 as a shared file system and its files via the virtual file system function or the input-output control function 101. This region is shown as a local file system region (shared region) 600 and the file 601 to be backed up. It is possible to register a plurality of files as the file 601 to be backed up. It is possible to select the files one by one for registering, to select a directory in the file system which is made available, and register all files under that directory, or to select the file systems which are made available and register all the files therein.

The replica region and replica number setting function 701 of the file to be backed up is used for a local file system (replica region) 610 and replica 1 (611), replica 2 (612), . . . , replica n (613), which is useable as a local file system of the NAS or the file server 100. Such system is not made available on the network 300, namely, it is a region which is inaccessible from the clients 200–204. The replica files to be synchronized are created in the region according to the set number of replicas to be created.

At this time, for example, if there is only one replica file 112, and the next file update process is instructed to the file to be backed up 110*a* while creating the fixed revision file 114 from the replica file 112, synchronization process of the replica file 112 for the next update process cannot be carried out since the replica file 112 is in use.

In this embodiment, in view of the above, a plurality of replica files 112 can be created. When file update is frequently carried out by multiple clients 200–204 through operation of the system, the process of creating the fixed revision files 114 from the replica files 112 is made to have multiplicity. Namely, as in this embodiment, by setting the plurality of replica files 112 (replica 1–n) in accordance with the updating frequency of the file to be backed up 110*a*, even if the fixed revision file 114 is being created from one replica file, by using one of the replica files 112 which is still synchronizing for the next update process by the clients 200–204, the update process may be performed in parallel.

The fixed revision region and fixed revision number setting function 702 for the file to be backed up is to be used for a shared/local file system region (fixed revision file region) 620 and fixed revision file 1 (621), fixed revision file 2 (622), . . . , fixed revision file m (623). The fixed revision region may be designated as a region for use by only the NAS or the file server 100, or may be made available as a shared file system on the network 300.

Depending on the system used, the fixed revision files 114 may be visible and efficiently used by the clients 200–204 on the network 300 as historical information of the file to be backed up. Alternatively, in an internal process of the NAS or the file server 100 which is not visible to the clients 200–204 on the outside, the fixed revision files 114 may be stored and used as backup data in the backup device.

If the number of the fixed revision files is not particularly set, all the fixed revision files may be created with revision management information such as a revision identifier or a backup date added thereto, as much as the capacity of the fixed revision region allows. When the number of the fixed revision files is set, the set value becomes the number of fixed revision files held as the historical information. For example, if the number of the fixed revision files to be created is set as five, the fixed revision files of the files to be backed up are subsequently created until there are five files. At the time the sixth file is created, the first and the oldest fixed revision file is discarded and a new fixed revision file is created, i.e., the oldest revision file is replaced with the new fixed revision file, thus making the total number of the managed revision files to be five. In this way, the capacity of the fixed revision region may be effectively used dependent on the system.

Figure 5:
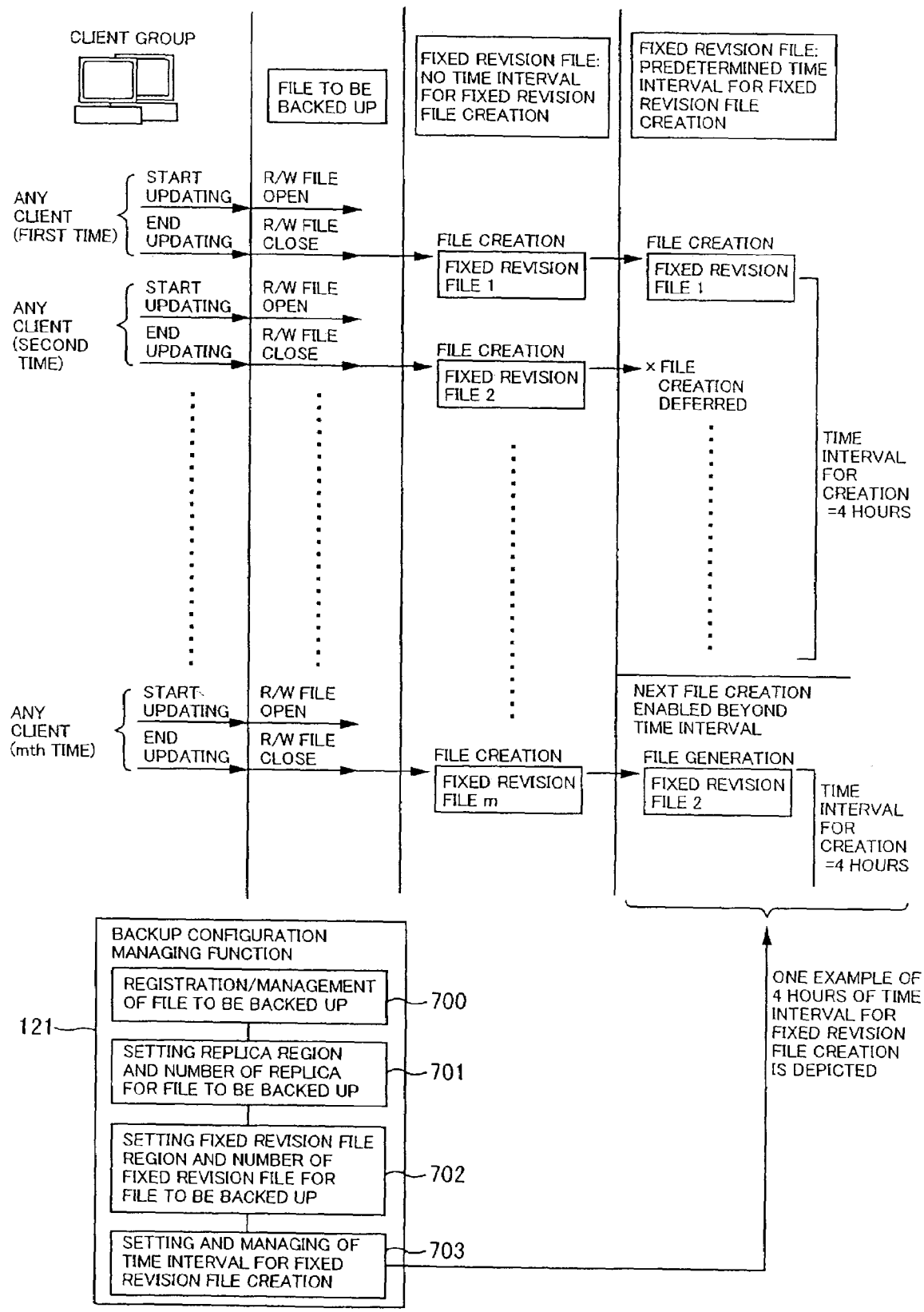
FIG. 5 is a schematic diagram showing a modified example of an effect of the storage apparatus implementing the file backup method according to an embodiment of the present invention.

Referring to FIG. 5, the fixed revision files creation interval setting and management function 703 in the backup configuration managing function 121 is described. As in an example of the fixed revision files created when there is no fixed revision file creation interval as shown in FIG. 5, in the file backup method of this embodiment, the fixed revision file is made each time the file is updated by the client, and the file close process in a read/write mode is detected. In this case, when the clients update the file to be backed up frequently, a fixed revision file 1 is created for the first update, a fixed revision file 2 is created for the second update, and a fixed revision file m is created for the mth update in succession. Therefore, if the number of fixed revision files is not set, there arises a problem that sufficient storing capacity is necessary for a fixed revision region and revision management becomes complicated. On the other hand, if the number of the fixed revision files is set, there is a problem that historical management cannot be performed beyond a very short time interval.

Thus, by setting the time interval for creating the fixed revision files by the fixed revision files creation time interval setting and management function 703 of the backup configuration managing function 121, creation of the fixed revision files in a set time interval only is made effective, and creation of the fixed revision files is not performed until such time interval elapses. In this way, the fixed revision files required for a system configuration may be efficiently created. In an example of FIG. 5, the fixed revision files creation time interval is set as four hours without setting the number of fixed revisions files. In the case the creation time interval is not set, when there is performed an update process for (m−1) times by any client, accordingly the fixed revision files are created until the (m−1)th revision. However, in the case the creation time interval is set to four hours, the fixed revision file 1 is created for a first update process, but the fixed revision file is not created for a second to a (m−1)th update processes since it is in the range of the fixed revision file creation time interval. Then, the fixed revision file, in accordance with the mth update process after the creation time interval of four hours has elapsed, is created as the fixed revision file 2. In this way, efficient historical management of the fixed revision files is realized.

Figure 6:
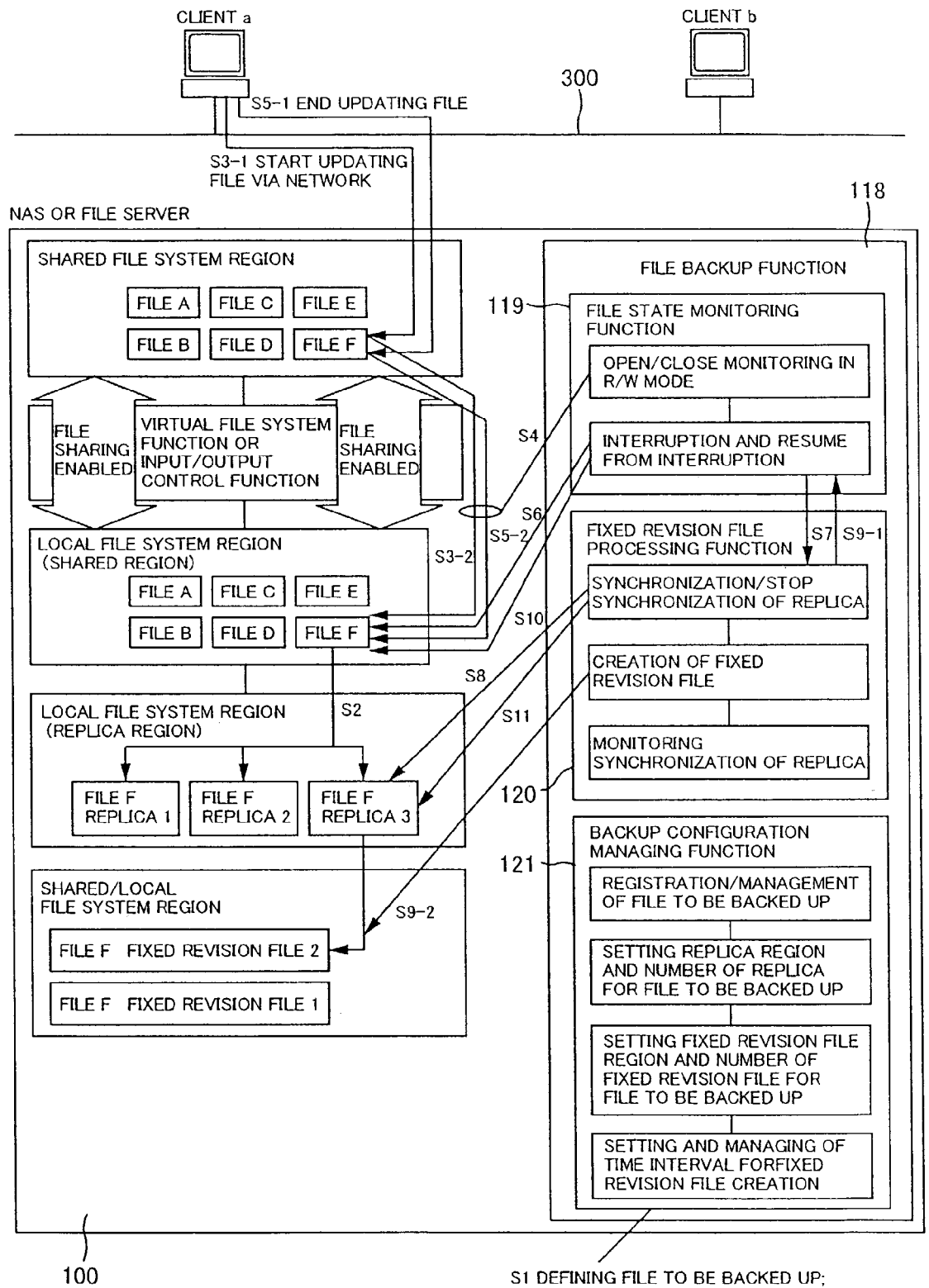
FIG. 6 is a schematic diagram showing an example of a function of the storage apparatus implementing the file backup method of an embodiment of the present invention.

FIG. 6 shows a more specific example of operation of the file backup process. In FIG. 6, the NAS or the file server 100 makes the local file system region (shared region) as a shared file system region accessible by the clients via the network, where the six files, i.e., file A, file B, file C, file D, file E and file F, are accessible. At this time, as an example, the file F is the file to be backed up in the backup process of this embodiment.

In a step S1, a file to be backed up, a replica file storing region, a number of replica files, a fixed revision file storing region, a number of fixed revision files, and a fixed revision files creation time interval are set.

In a step S2, the replica synchronization and synchronization-stop function creates the replica files according to the replica storing region and the number of replicas which are set, and starts the synchronization process. In the illustrated process, three replica files are set to be created.

In a step S3-1, an update process of the file F by the client a is started. Then, the file F is locked at the local file system level in a step S3-2, and is opened in a read/write mode (R/W mode).

In a step S4, open/close of the file to be backed up (file F) is monitored by the open/close monitoring function 400 in a read/write mode, and the file open is detected.

In a step S5-1, the file update by the client a is completed. Then, the file F is closed at the local file system level, to unlock the file.

In a step S6, the open/close monitoring function 400 in the R/W mode detects the file open of the file F in the read/write mode (R/W mode), and is in a state where creation of the fixed revision files is possible exceeding the fixed revision file creation time interval set in the step S1, and locks the file F by the interrupt and interrupt-stop function.

In a step S7, subsequently, stop of synchronization of the replica files is requested by the replica synchronization and synchronization-stop function.

In a step S8, the replica files which may be split from synchronization by the replica synchronization state monitoring function 502 are detected, and one of the synchronization process of the replica files is stopped to split from synchronization by the replica synchronization and synchronization-stop function 500. In the illustrated process, out of the three replica files, synchronization is stopped for the file F and the replica 3.

In a step S9-1, the stop of synchronization process of the specific replica file is immediately notified to the interrupt and resume from interrupt function 401. In a step S9-2, the split replica file from the synchronization process which is halted is copied with revision management information such as a revision identifier and a backup date added, to the fixed revision file storing region to create a fixed revision file. In this exemplary step, the revision ID is shown by a number, and the fixed revision file 1 of the file F is already defined. The replica 3 of the file F which is split from the synchronization process and halted is defined as a fixed revision file 2 of the file F.

Note that, in the process S8, if a synchronized replica file is not found, error information instead of replica file data is recorded in the fixed revision file which is intended to be created.

In a step S10, the interrupt and interrupt-stop function 401 has already been notified of completion of synchronization of the replica files from the replica synchronization and synchronization-stop function 500, and unlocks the file F. Thus, the update process to the file F by the clients becomes possible.

Note that, the time period from locking to unlocking of the file F in the steps S6 to S10 is merely instantaneous for stopping synchronization with the replica 3. There is hardly no influence to access of the shared file F from the clients.

In a step S11, when creation process of the fixed revision file from the replica file in the step S9-2 is completed, synchronization of the replica file with the file to be backed up is resumed. In the illustrated process, when creation of the fixed revision file 2 of the file F from the replica 3 of the file F is completed, the synchronization process of the file F and the replica 3 of the file F is resumed.

Figure 7:
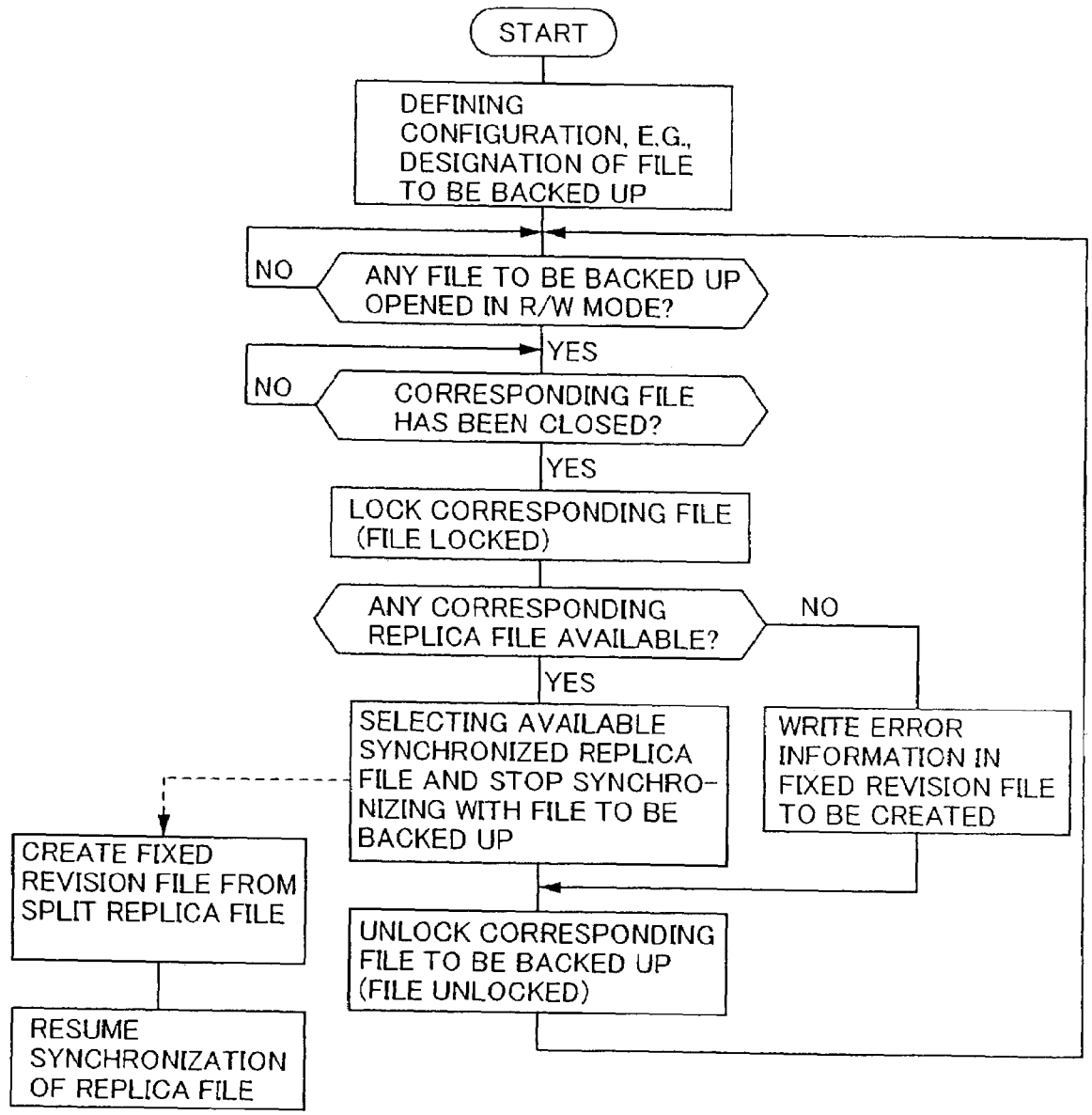
FIG. 7 is a flowchart showing an example of a process of the file backup method of an embodiment of the present invention.
Figure 8:
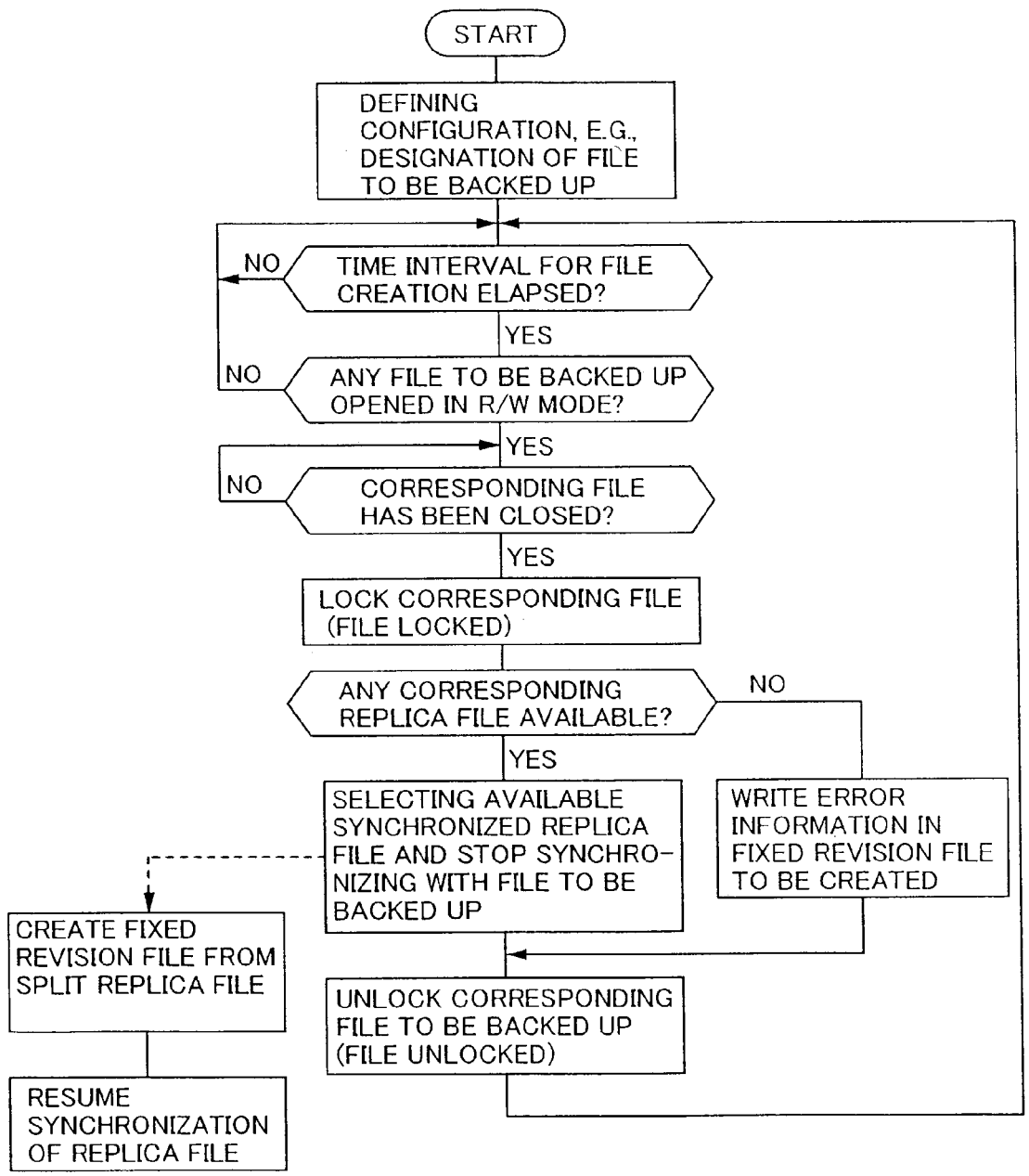
FIG. 8 is a flowchart showing a modified example of a process of the file backup method of an embodiment of the present invention.

FIGS. 7 and 8 show flowcharts of the above described file backup processes. FIG. 7 illustrates the case where no fixed revision file creation time interval is set, and FIG. 8 illustrates the case where a fixed revision file creation time interval is set.

As described above, according to the file backup method and storage apparatus of this embodiment, automatic file backup and automatic historical management of backup data are made possible in a storage apparatus such as a NAS or a file server, which is made available to the clients on the network 300, where online file update processes are conducted to the files in the shared region made usable on the network 300.

Although the invention of the present inventors have been specifically described based on the embodiment, it should be understood that the present invention is not to be limited by this embodiment, and various alterations can be made therein without departing from the spirit and scope of the invention.

What is claimed is:

1. A method of backing up a file comprising:
   synchronizing a first file to be backed up and a second file which is a copy of said first file to contain the same contents;
   monitoring a file close process of said first file in a read/write mode, and when the file close process is detected, locking said first file and stopping synchronization of said first file and said second file, and unlocking said first file after stopping synchronization without performing any intermediate step on said first file between stopping synchronization of said first file and unlocking said first file;
   creating a third file which is a copy of said second file;
   resuming said synchronization of said first file and said second file; and
   backing up said first file.

2. A method of backing up a file according to claim 1 wherein
   a plurality of said second files are prepared for said single first file to be backed up, and
   monitoring whether said second files in synchronization process are in a fully synchronized state in which file contents are completely matching, and when said file close process is detected, one of said plurality of second files which is completely synchronized with said first file is selected, and said third file which is a copy of said selected second file is created repetitively in time sequence.

3. A method of backing up a file according to claim 2 wherein the third file is copied in time sequence with revision management information comprising a revision identifier and a time information regarding time at which said copy was created.

4. A method of backing up a file according to claim 1 wherein a plurality of said second files is set in accordance with an updating frequency of said first file are prepared for said first file.

5. A method of backing up a file according to claim 1 wherein
   a plurality of third files are created repetitively in time sequence as a copy of said second file;
   an upper limit to a number of said third files to be created is set;
   when a number of said third files created exceeds said upper limit, an oldest one among said created third files is replaced with said newly created third file.

6. A method of backing up a file according to claim 1 wherein
   a time interval for creating said third files which is a copy of said first file by means of said second file is set, and
   after one said third file is created, another said third file would not be created until the time interval elapses.

7. A storage apparatus connected to a network, storing a first file shared by a plurality of elements having access to said first file via said network, said first file being a file to be backed up, comprising:
   means for synchronizing said first file to be backed up and a second file which is a copy of said first file to contain the same contents;
   means for monitoring a file close process of said first file in a read/write mode, and when the file close process is detected, locking said first file and stopping synchronization of said first file and said second file, and unlocking said first file after stopping synchronization without performing any intermediate step on said first file between stopping synchronization of said first file and unlocking said first file;
   means for creating a third file which is a copy of said second file; and
   means for resuming said synchronization of said first file and said second file.

8. A storage apparatus according to claim 7 wherein
a plurality of said second files are prepared for said single first file to be backed up,
means for monitoring whether said second files in synchronization process are in a fully synchronized state in which file contents are completely matching, and
every time said file close process is detected, said means for creating a third file selects one of said plurality of second files which is completely synchronized with said first file, and create a new third file which is a copy of said selected second file repetitively in time sequence.

9. A storage apparatus according to claim 7 wherein
an upper limit to a number of said third files to be created is set;
when a number of said third files created exceeds said upper limit, said means for creating a third file replaces an oldest one among said created third files with said newly created third file.

10. A storage apparatus according to claim 7
wherein a time interval between creation of said third files which is a copy of said first file by means of said second file is set, and
wherein after said means for creating one said third file operates, another said third file would not be created until the time interval elapses.

11. A method for backing up a file which is made available on a network and accessible by one or more computers via said network, comprising:
creating a plurality of replica files, each corresponding to the file to be backed up and synchronizing said file to be backed up and each of said replica files;
monitoring a file open and a file close processes executed at the time of updating of contents of said file to be backed up by said computers;
monitoring whether said replica files in synchronization process are in a fully synchronized state in which file contents are completely matching;
when said file close process is detected, stopping synchronization of either one of said plurality of replica files which is completely synchronized with said file to be backed up with said file to be backed up;
creating in time sequence a copy of said replica file which is split from said file to be backed up as a fixed backup file of said file to be backed up; and
backing up said file.

12. A method for backing up a file according to claim 11, wherein
an upper limit to a number of said copies of replica files to be created is set, and
when a number of said copies of replica files created exceeds said upper limit, an oldest one among said created copies of said replica files is replaced with said newly created copy of said replica files.

13. A method for backing up a file according to claim 11, wherein
a time interval between creation of said copies of replica files is set, and
said copy of replica file is created after said time interval elapses when said file close process to said file to be backed up is detected.

14. A method for backing up a file according to claim 11, wherein
a plurality of files accessible by said computers via said network are designated as files to be backed up.

15. A method for backing up a file according to claim 11, wherein
when neither of said replica files is in synchronism with said file to be backed up, error information is recorded in the fixed backup file.

16. A method for backing up a file according to claim 11, wherein
said copies of said replica files are provided with a predetermined identifier and time information regarding time at which said copy was created.

17. A storage apparatus connected to a network, storing a file accessible by one or more computers via said network, said file being a file to be backed up, comprising:
at least one logical device storing said file to be backed up, and
a controller connected to said network and controlling data input and output to/from said logical device, said controller comprising a storage device containing a computer program comprising
machine-executable code for creating a plurality of replica files, each corresponding to the file to be backed up and synchronizing said file to be backed up and each of said replica files;
machine-executable code for monitoring a file open and a file close processes executed at the time of updating of contents of said file to be backed up by said computers;
machine-executable code for monitoring whether said replica files in synchronization process are in a fully synchronized state in which file contents are completely matching;
machine-executable code for stopping synchronization of either one of said plurality of replica files which is completely synchronized with said file to be backed up with said file to be backed up when said file close process is detected; and
machine-executable code for creating in time sequence a copy of said replica file which is split from said file to be backed up as a fixed backup file of said file to be backed up.

18. A storage apparatus connected to a network, storing a file accessible by one or more computers via said network, said file being a file to be backed up, comprising:
at least one logical device storing said file to be backed up, and
a controller connected to said network and controlling data input and output to/from said logical device, said controller comprising
means for creating a plurality of replica files, each corresponding to the file to be backed up and synchronizing said file to be backed up and each of said replica files;
means for monitoring a file open and a file close processes executed at the time of updating of contents of said file to be backed up by said computers;
means for monitoring whether said second files in synchronization process are in a fully synchronized state in which file contents are completely matching;
means for stopping synchronization of either one of said plurality of replica files which is completely synchronized with said file to be backed up with said file to be backed up when said file close process is detected; and
means for creating in time sequence a copy of said replica file which is split from said file to be backed up as a fixed backup file of said file to be backed up.

19. A computer-readable storage medium containing a computer program for backing up a file accessible by one or more computers via a network, comprising:

machine-executable code for creating a plurality of replica files, each corresponding to the file to be backed up and synchronizing said file to be backed up and each of said replica files;

machine-executable code for monitoring a file open and a file close processes executed at the time of updating of contents of said file to be backed up by said computers;

machine-executable code for monitoring whether said replica files in synchronization process are in a fully synchronized state in which file contents are completely matching;

machine-executable code for stopping synchronization of either one of said plurality of replica files which is completely synchronized with said file to be backed up with said file to be backed up when said file close process is detected; and machine-executable code for creating in time sequence a copy of said replica file which is split from said file to be backed up as a fixed backup file of said file to be backed up.

20. A computer-readable medium containing a computer program for backing up a file accessible by one or more computers via a network, comprising:

machine-executable code for creating a plurality of replica files, each corresponding to the file to be backed up and synchronizing said file to be backed up and each of said replica files;

machine-executable code for monitoring a file open and a file close processes executed at the time of updating of contents of said file to be backed up by said computers;

machine-executable code for monitoring whether said replica files in synchronization process are in a fully synchronized state in which file contents are completely matching;

machine-executable code for stopping synchronization of either one of said plurality of replica files which is completely synchronized with said file to be backed up with said file to be backed up when said file close process is detected; and machine-executable code for creating in time sequence a copy of said replica file which is split from said file to be backed up as a fixed backup file of said file to be backed up.

* * * * *